US011370704B2

(12) United States Patent
Cossement et al.

(10) Patent No.: US 11,370,704 B2
(45) Date of Patent: Jun. 28, 2022

(54) SIZING COMPOSITIONS INCLUDING WEAKLY-COORDINATING ANION SALTS AND USES THEREOF

(71) Applicant: Owens Corning Intellectual Capital, LLC, Toledo, OH (US)

(72) Inventors: Marc Cossement, Polleur (BE); Jean-Philippe Gasca, Saint-Jean-de-la-Porte (FR); Yvan Besson, Mery (FR); Julien Romeyer, Aix-les-Baines (FR)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 192 days.

(21) Appl. No.: 16/652,990

(22) PCT Filed: Oct. 16, 2018

(86) PCT No.: PCT/US2018/055983
§ 371 (c)(1),
(2) Date: Apr. 2, 2020

(87) PCT Pub. No.: WO2019/083769
PCT Pub. Date: May 2, 2019

(65) Prior Publication Data
US 2020/0291205 A1 Sep. 17, 2020

Related U.S. Application Data

(60) Provisional application No. 62/577,997, filed on Oct. 27, 2017.

(51) Int. Cl.
| | | |
|---|---|---|
| *C08K 3/32* | (2006.01) | |
| *C03C 25/30* | (2018.01) | |
| *C03C 25/47* | (2018.01) | |
| *C08K 7/14* | (2006.01) | |
| *C08K 9/06* | (2006.01) | |
| *C08K 5/544* | (2006.01) | |

(52) U.S. Cl.
CPC .............. *C03C 25/30* (2013.01); *C03C 25/47* (2018.01); *C08K 3/32* (2013.01); *C08K 5/544* (2013.01); *C08K 7/14* (2013.01); *C08K 9/06* (2013.01); *C08K 2003/321* (2013.01)

(58) Field of Classification Search
CPC ........... C03C 25/30; C03C 25/47; C08K 3/32; C08K 5/544; C08K 7/14; C08K 9/06; C08K 2003/321; C08L 51/06; C08L 23/12
USPC ....................................................... 523/202
See application file for complete search history.

(56) References Cited

U.S. PATENT DOCUMENTS

| | | |
|---|---|---|
| 3,936,285 A | 2/1976 | Maaghul |
| 4,126,729 A | 11/1978 | Richardson et al. |
| 4,271,229 A | 6/1981 | Temple |
| 4,289,672 A | 9/1981 | Friederich et al. |
| 4,309,326 A | 1/1982 | Sage et al. |
| 4,339,567 A | 7/1982 | Green et al. |
| 4,341,877 A | 7/1982 | Das et al. |
| 4,374,177 A | 2/1983 | Hsu et al. |
| 4,394,418 A | 7/1983 | Temple |
| 4,435,474 A | 3/1984 | Das et al. |
| 4,448,910 A | 5/1984 | Haines et al. |
| 4,461,804 A | 7/1984 | Motsinger et al. |
| 5,104,602 A | 4/1992 | Landry et al. |
| 5,221,285 A | 6/1993 | Andrews et al. |
| 5,242,958 A | 9/1993 | Klett et al. |
| 5,326,437 A | 7/1994 | Bulan et al. |
| 5,437,943 A | 8/1995 | Fujii et al. |
| 5,605,757 A | 2/1997 | Klett |
| 5,646,207 A | 7/1997 | Schell |
| 5,773,146 A | 6/1998 | Lawton et al. |
| 5,779,758 A | 7/1998 | Mann et al. |
| 5,804,313 A | 9/1998 | Schell |
| 5,882,792 A | 3/1999 | Moireau |
| 5,977,232 A | 11/1999 | Arkens et al. |
| 6,090,487 A | 7/2000 | Moireau |
| 6,207,737 B1 | 3/2001 | Schell et al. |
| 6,365,272 B1 | 4/2002 | Masson et al. |
| 6,551,707 B1 | 4/2003 | Adzima et al. |

(Continued)

FOREIGN PATENT DOCUMENTS

| | | |
|---|---|---|
| CN | 101469145 A | 7/2009 |
| EP | 100005 A1 | 2/1984 |

(Continued)

OTHER PUBLICATIONS

Dey et al., "Influence of sizing formulations on glass/epoxy interphase properties," Composites Part A: Applied Science and Manufacturing, v 63, 59-67, Aug. 2014; ISSN: 1359-835X; DOI: 10.1016/j.compositesa.2014.04.006; Publisher Elsevier B.V., Netherlands. Abstract only.

Chen et al., "Preparation and performance of nano-SiO2 stabilized Pickering emulsion type sizing agent for glass fiber," Polymer Composites, 2014; ISSN: 02728397; E-ISSN: 15480569; DOI: 10.1002/pc.23185. Abstract Only.

Zhuang et al., "NaBF4 as a hygrothermal durability enhancer for glass fibre reinforced polypropylene composites," Composites Science and Techonology, 2011, v 71, 1461-1470; DOI: 10.1016/j.compscitech.2011.06.002.

(Continued)

*Primary Examiner* — Hannah J Pak
(74) *Attorney, Agent, or Firm* — Calfee, Halter & Griswold LLP

(57) ABSTRACT

A sizing composition including water, a film former, a silane coupling agent, and a weakly-coordinating anion salt is provided. The sizing composition may be applied to fibers used to reinforce polymer compositions. Fiber reinforced composite materials that include reinforcing fibers sized with the sizing composition exhibit improved physical properties, particularly after the fiber reinforced composite material has experience prolonged exposure to heat and water.

21 Claims, No Drawings

(56) References Cited

U.S. PATENT DOCUMENTS

| | | |
|---|---|---|
| 6,818,698 B1 | 11/2004 | Kashikar |
| 7,288,604 B2 | 10/2007 | Kuntimaddi et al. |
| 7,465,764 B2 | 12/2008 | Adzima et al. |
| 7,585,563 B2 | 9/2009 | Kashikar et al. |
| 7,732,047 B2 | 6/2010 | Kashikar et al. |
| 9,834,474 B2 | 12/2017 | Masson et al. |
| 11,001,525 B2 * | 5/2021 | Huang ............ B32B 13/08 |
| 2002/0031665 A1 | 3/2002 | Audenaert et al. |
| 2003/0082127 A1 | 5/2003 | Butts et al. |
| 2004/0132546 A1 | 7/2004 | Kuntimaddi et al. |
| 2005/0281998 A1 | 12/2005 | Baker et al. |
| 2006/0036003 A1 | 2/2006 | Adzima et al. |
| 2007/0032157 A1 | 2/2007 | McGrath et al. |
| 2007/0059506 A1 | 3/2007 | Hager et al. |
| 2007/0066703 A1 | 3/2007 | Shinohara et al. |
| 2007/0072989 A1 | 3/2007 | Piret et al. |
| 2009/0077900 A1 | 3/2009 | Chuda et al. |
| 2009/0092832 A1 | 4/2009 | Moireau |
| 2009/0137709 A1 | 5/2009 | Krauter et al. |
| 2009/0159228 A1 | 6/2009 | Law et al. |
| 2010/0055439 A1 | 3/2010 | Lee et al. |
| 2010/0239840 A1 | 9/2010 | Kashikar et al. |
| 2011/0098386 A1 | 4/2011 | Krauter et al. |
| 2011/0229690 A1 | 9/2011 | Lee et al. |
| 2011/0269896 A1 | 11/2011 | Wehrmann et al. |
| 2014/0243467 A1 | 8/2014 | Dern et al. |
| 2014/0329948 A1 | 11/2014 | Erkelenz et al. |
| 2016/0046107 A1 | 2/2016 | Zhang et al. |

FOREIGN PATENT DOCUMENTS

| | | |
|---|---|---|
| EP | 826710 B1 | 9/2001 |
| EP | 2540683 A1 | 1/2013 |
| JP | 07228756 A | 8/1995 |
| JP | 2005256008 A | 9/2005 |
| WO | 1994011318 A1 | 5/1994 |
| WO | 1999024492 A1 | 5/1999 |
| WO | 2000029483 A1 | 5/2000 |
| WO | 2007067667 A2 | 6/2007 |
| WO | 2009030356 A1 | 3/2009 |
| WO | 2013079599 A1 | 6/2013 |
| WO | 2014195659 A1 | 12/2014 |

OTHER PUBLICATIONS

International Search Report and Written Opinion from PCT/US2018/055983 dated Feb. 19, 2019.

Office Action from IN Application No. 202037016239 dated Nov. 10, 2021.

Office Action from CN Application No. 201880069988.3 dated Feb. 28, 2022.

Office Action from RU Application No. 2020112985 dated Feb. 18, 2022.

* cited by examiner

SIZING COMPOSITIONS INCLUDING WEAKLY-COORDINATING ANION SALTS AND USES THEREOF

RELATED APPLICATIONS

This application is the U.S. national stage entry of PCT/US2018/055983, filed on Oct. 16, 2018, which claims priority to and all benefit of U.S. Provisional Application No. 62/577,997, filed on Oct. 27, 2017, the entire disclosures of which are fully incorporated herein by reference.

FIELD

The general inventive concepts relate to sizing compositions, and more particularly to sizing compositions that include a weakly-coordinating anion salt and uses thereof.

BACKGROUND

The reinforced composite industry has used reinforcing fibers, such as glass, mineral, or polymeric fibers, in the form of continuous fibers, chopped fibers, strands, or rovings for reinforcing a wide range of polymer compositions suitable for use in a wide range of applications. The reinforced polymer compositions may, in turn, be used in manufacturing a wide range of composite products that tend to exhibit improved resilience and strength relative to that which can be achieved with polymer compositions that do not include reinforcing fibers.

Reinforcing fibers are typically coated with a sizing composition to improve the processing properties of the reinforcing fibers, as well as to promote adhesion between the reinforcing fibers and the polymer matrix in which the reinforcing fibers are to be used. The sizing composition can also affect the physical properties of the reinforced composite product. For example, the sizing composition may form an interphase between the reinforcing fiber and the polymer matrix. When a load is applied to the reinforced composite product, force is transferred from the polymer matrix to the reinforcing fibers. The efficient transfer of the load and a good degree of adhesion between the fiber-interphase-polymer matrix is generally achieved by applying an appropriate sizing composition to the reinforcing fibers.

After prolonged exposure to certain environmental conditions (e.g., heat, water), reinforced composite products can exhibit a reduction in mechanical properties, which can lead to premature failure of the reinforced composite product. The reduction in mechanical properties may result from degradation of the interphase formed by the sizing composition between the reinforcing fiber and the polymer matrix. Accordingly, there remains a need for a sizing composition that can form an interphase that is strong and resistant to degradation caused by heat and water, and exhibits good retention of mechanical properties after prolonged exposure to heat and water.

SUMMARY

The general inventive concepts are directed to sizing compositions that include a film former, a silane coupling agent, and a weakly-coordinating anion salt. The general inventive concepts also relate to reinforcing fibers sized with the inventive sizing compositions described herein. The general inventive concepts further relate to fiber reinforced composite materials that include reinforcing fibers sized with the inventive sizing compositions described herein. By way of example to illustrate various aspects of the general inventive concepts, several exemplary embodiments of sizing compositions, reinforcing fibers, and fiber reinforced composite materials are provided herein.

In one exemplary embodiment, a sizing composition is provided. The sizing composition includes water, a film former, a silane coupling agent, and a weakly-coordinating anion salt. The weakly-coordinating anion salt comprises a weakly-coordinating anion and a counter-cation, wherein the weakly-coordinating anion is selected from the group consisting of hexafluorophosphate, hexafluoroarsenate, hexafluoroantimonate, and hexafluorobismuthate, and the counter-cation is selected from the group consisting of an alkali metal, ammonium, and an alkaline earth metal.

In one exemplary embodiment, reinforcing fibers for use in reinforcing a polymer composition are provided. The reinforcing fibers comprise fibers selected from glass fibers, mineral fibers, polymeric fibers, and combinations thereof. The fibers are coated with a sizing composition. The sizing composition includes a film former, a silane coupling agent, and a weakly-coordinating anion salt. The weakly-coordinating anion salt comprises a weakly-coordinating anion and a counter-cation, wherein the weakly-coordinating anion is selected from the group consisting of hexafluorophosphate, hexafluoroarsenate, hexafluoroantimonate, and hexafluorobismuthate, and the counter-cation is selected from the group consisting of an alkali metal, ammonium, and an alkaline earth metal. In certain embodiments, the sizing composition is present on the fibers in an amount of from 0.1 wt % to 5 wt % based on the total weight of the reinforcing fibers.

In one exemplary embodiment, a fiber reinforced composite is provided. The fiber reinforced composite includes a polymer matrix and reinforcing fibers distributed throughout the polymer matrix. The reinforcing fibers include fibers coated with a sizing composition. The sizing composition comprises a film former, a silane coupling agent, and a weakly-coordinating anion salt. The weakly-coordinating anion salt comprises a weakly-coordinating anion and a counter-cation, wherein the weakly-coordinating anion is selected from the group consisting of hexafluorophosphate, hexafluoroarsenate, hexafluoroantimonate, and hexafluorobismuthate, and the counter-cation is selected from the group consisting of an alkali metal, ammonium, and an alkaline earth metal. In certain embodiments, the fiber reinforced composite comprises at least 30 wt % reinforcing fibers.

DETAILED DESCRIPTION

While various exemplary compositions and articles of manufacture are described herein, other compositions and articles of manufacture similar or equivalent to those described herein are encompassed by the general inventive concepts. While the general inventive concepts are susceptible of embodiment in many different forms, several embodiments are described herein in detail with the understanding that the present disclosure is to be considered as an exemplification of the principles of the general inventive concepts. Accordingly, the general inventive concepts are not intended to be limited to the specific embodiments described herein.

The terminology as set forth herein is for description of the embodiments only and should not be construed as limiting the disclosure as a whole. As used in the description and the appended claims, the singular forms "a," "an," and "the" are intended to include the plural forms as well, unless the context clearly indicates otherwise. All references to singular characteristics or limitations of the present disclosure shall include the corresponding plural characteristic or limitation, and vice versa, unless otherwise specified or clearly implied to the contrary by the context in which the reference is made. All materials incorporated by reference are incorporated in their entirety unless otherwise stated. Unless otherwise indicated (e.g., by use of the term "precisely"), all numbers expressing quantities, properties such as molecular weight, reaction conditions, and so forth as used in this disclosure are to be understood as being modified in all instances by the term "about." Accordingly, unless otherwise indicated, the numerical properties set forth in this disclosure are approximations that may vary depending on the desired properties sought to be obtained in the embodiments described herein.

The phrase "weakly-coordinating anion" as used herein refers to an anion that weakly interacts with a cation and exhibits very low nucleophilicity and basicity.

The general inventive concepts are directed to a sizing composition that comprises water, a film former, a silane coupling agent, and a weakly-coordinating anion salt. The general inventive concepts are also directed to reinforcing fibers sized with the inventive sizing composition, as well as fiber reinforced composites that include reinforcing fibers sized with the inventive sizing composition.

The general inventive concepts disclosed herein are based, at least in part, on the discovery that fiber reinforced composites that include reinforcing fibers sized with a sizing composition that includes certain weakly-coordinating anion salts exhibit improved mechanical properties, particularly mechanical properties after prolonged exposure to heated water (i.e., hydro-aging). It is believed that certain weakly-coordinating anion salts have a hydrophobizing effect on the fiber surface (caused by local concentration of grouped fluorine entities) that may favor affinity between the sizing composition and the polymer matrix resulting in stronger interaction as well as provide protection against the degrading effects of water and moisture.

In one exemplary embodiment, a sizing composition is provided. The sizing composition comprises water, a film former, a silane coupling agent, and a weakly-coordinating anion salt. The weakly-coordinating anion salt comprises a weakly-coordinating anion and a counter-cation.

The exemplary sizing compositions disclosed herein include a film former. In general, film formers are polymers used in sizing compositions that are applied to fibers to provide a protective layer on the surface of the fibers and to improve processability of the fibers. The film formers also promote bonding of the fibers together at various contact points along the fibers, which imparts effective strand or bundle integrity such that the integrity is maintained during subsequent processing.

In certain exemplary embodiments, the film former comprises a modified polyolefin. The term "modified polyolefin" as used herein refers to a polymeric olefin that has been chemically modified and functionalized to incorporate one or more reactive functional groups (e.g., amino, hydroxyl, carboxy, carboxyl, mercapto, methacrylate, sulfide, acid anhydride, epoxy) on the main polyolefin polymer chain. Typically, the modified polyolefin is based on olefin monomers having from two to six carbon atoms, and such polyolefins include, but are not limited to, polypropylene, polyethylene, polybutene, polyisobutylene, and polyhexene. Preferred polymers include the homo- and co-polymers of polypropylene that are crystalline, semi-crystalline, amorphous, or rubbery and elastomeric and mixtures thereof. In certain exemplary embodiments, the film former may comprise a modified polyolefin and at least one additional film forming polymer. The additional film forming polymer may include, but are not limited to, polymeric agents based on glycidyl acrylates, glycidyl methacrylates, styrene-maleic anhydride, polyesters, polyehers, polyurethanes, polyamides, polyimides, polyvinylpyrolidones, acrylic acids, methacrylic acids and their co-polymers, or any other polymers that are known for their ability to achieve the desired effects including the ability to form films.

As mentioned, the modified polyolefin is modified to include one or more reactive functional groups on the main polyolefin chain. Reactive functional groups are groups that are capable of undergoing further chemical reactions with other chemical species. Some examples of such reactive functional groups include, but are not limited to, acid anhydride, carboxylic acid, hydroxyl, amino, amide, ester, isocyanate, double bonds, and epoxy groups. Although many types of reactive functional groups can be attached to the polyolefin chains, it may be desirable to avoid unreactive and unreacted nitrogen-containing and conjugated unsaturated functional groups. Accordingly, in certain exemplary embodiments, the modified polyolefin is modified by the addition of at least one of an acid anhydride group, a carboxylic acid group, a hydroxyl group, and an epoxy group. In certain exemplary embodiments, the modified polyolefin is modified by the addition of a substituent selected from the group consisting of maleic anhydride, maleic acid, acrylic acid, methacrylic acid, acrylic anhydride, methacrylic anhydride, and oxiranes such as glycidyl acrylates or glycidyl methacrylates. In certain exemplary embodiments, the modified polyolefin is a maleic anhydride modified polypropylene. These reactive functional groups may also be present on any additional film former that may be used in the sizing composition.

Modified polyolefins, such as modified polypropylenes, are commercially available as aqueous emulsions. The aqueous emulsions may include components in addition to the modified polyolefin such as, for example, nonionic surfactants, lubricants, wetting agents, and emulsifiers. Preferably, all components of the modified polyolefin emulsion are selected to improve strength and compatibility with the polymer matrix used to prepare a fiber reinforced composite. Generally, the level of reactive functional groups present on the polyolefin will range from 0.025 wt % to 15 wt % based on the total weight of the polyolefin. In certain exemplary embodiments, the amount of film former in the sizing composition ranges from 50 wt % to 90 wt % based on the dry solids content of the sizing composition. In certain exemplary embodiments, the amount of film former in the sizing composition ranges from 60 wt % to 90 wt % based on the dry solids content of the sizing composition, including from 70 wt % to 90 wt %, from 80 wt % to 90 wt %, and also including from 80 wt % to 85 wt % based on the dry solids content of the sizing composition. In certain exemplary embodiments, the amount of modified polyolefin in the sizing composition ranges from about 50 wt % to 90 wt % based on the dry solids content of the sizing composition, including from 60 wt % to 90 wt %, from 70 wt % to 90 wt %, from 80 wt % to 90 wt %, and also including from 80 wt % to 85 wt % based on the dry solids content of the sizing composition. In certain exemplary embodiments, the film former comprises a maleic anhydride modified polypropylene, which is present in the sizing composition in an amount of from 50 wt % to 90 wt % based on the dry solids content of the sizing composition, including from 60 wt % to 90 wt %, from 70 wt % to 90 wt %, from 80 wt % to 90 wt %, and also including from 80 wt % to 85 wt % based on the dry solids content of the sizing composition.

Modified polyolefin emulsions suitable for use as a film former in the exemplary sizing compositions disclosed herein include, but are not limited to, polyolefin emulsions disclosed in U.S. Pat. No. 6,818,698, which issued Nov. 16, 2004, the content of which is hereby incorporated by reference in its entirety and for all purposes consistent with the present disclosure that describes a method for the aqueous emulsification of high molecular weight polyolefins that apparently reduces or prevents the traditional problems in preparing such emulsions, even for polypropylene polymers having molecular weights greater than about 80,000 Daltons, and even greater than about 100,000 Daltons. As examples, a 34.5% to 35.5% non-volatile/non-ionic maleated polypropylene dispersion can be used such as the dispersions provided by Michelman, Inc. (Cincinnati, Ohio), BYK-Chemie GmbH (Wesel, Germany), and Achitex Minerva S.p.A. (Vaiano Cremasco, Italy).

The exemplary sizing compositions disclosed herein include a silane coupling agent. The silane coupling agent may be in a partially or a fully hydrolyzed state or in a non-hydrolyzed state. The silane coupling agent may also be in monomeric, oligomeric, or polymeric form prior to, during, or after its use. The silane coupling agent functions to promote the adhesion between the film former and the reinforcing fibers as well as to promote adhesion between the reinforcing fibers and the polymer matrix of a fiber reinforced composite. Examples of silane coupling agents that may be used in the sizing compositions disclosed herein may be characterized by the functional groups amino, epoxy, vinyl, methacryloxy, ureido, isocyanato, and azamido.

Examples of particular silane coupling agents suitable for use in the sizing composition include, but are not limited to, γ-aminopropyltriethoxysilane (A-1100), γ-glycidoxypropyltrimethoxysilane (A-187), γ-methacryloxypropyltrimethoxysilane (A-174), n-βaminoethyl-γ-aminopropyltrimethoxysilane (A-1120), methyl-trichlorosilane (A-154), methyltrimethoxysilane (A-163), γ-mercaptopropyltrimethoxy-silane (A-189), γ-chloropropyl-trimethoxy-silane (A-143), vinyl-triethoxy-silane (A-151), vinyl-tris-(2-methoxyethoxy)silane (A-2171), vinyl-triacetoxy silane (A-188), octyltriethoxysilane (A-137), methyltriethoxysilane (A-162), and methyltrimethoxysilane (A-1630). All of the silane coupling agents listed herein are commercially available as Silquest™ products from Momentive Performance Materials, Inc. (Waterford, N.Y.).

In certain exemplary embodiments, the silane coupling agent is selected from the group consisting of an amino silane, a methacryloxy silane, a silane ester, a vinyl silane, an epoxy silane, a sulfur silane, a ureido silane, an isocyanato silane, an azamido silane, and combinations thereof. In certain exemplary embodiments, the silane coupling agent comprises an amino silane. In certain exemplary embodiments, the silane coupling agent comprises γ-aminopropyl-triethoxysilane (A-1100).

In certain exemplary embodiments, the sizing composition includes a silane coupling agent in an amount such that the silane coupling agent comprises from 5 wt % to 20 wt % of the dry solids content of the sizing composition. In certain exemplary embodiments, the silane coupling agent comprises from 6 wt % to 18 wt % of the dry solids content of the sizing composition, including from 6 wt % to 16 wt %, and also including from 8 wt % to 16 wt % of the dry solids of the sizing composition. In certain of the foregoing exemplary embodiments, the silane coupling agent is selected from the group consisting of an amino silane, a methacryloxy silane, a silane ester, a vinyl silane, an epoxy silane, a sulfur silane, a ureido silane, an isocyanato silane, an azamido silane, and combinations thereof. In certain of the foregoing exemplary embodiments, the silane coupling agent comprises an amino silane. In certain of the foregoing exemplary embodiments, the silane coupling agent comprises γ-aminopropyltriethoxysilane (A-1100).

The exemplary sizing compositions disclosed herein also include a weakly-coordinating anion salt. As previously noted, it is believed that when used in a sizing composition applied to reinforcing fibers that are used in fiber reinforced composites certain weakly-coordinating anion salts have a hydrophobizing effect on the fiber surface that may favor interaction between the sizing composition and the polymer matrix resulting in stronger adhesion as well as provide protection against the degrading effects of water and moisture. The weakly-coordinating anion salt comprises a weakly-coordinating anion and a counter-cation. In certain exemplary embodiments, the weakly-coordinating anion is a hexafluoride anion. Exemplary hexafluoride anions included hexafluorophosphate ($PF_6^-$), hexafluoroarsenate ($AsF_6^-$), hexafluoroantimonate ($SbF_6^-$), and hexafluorobismuthate ($BiF_6^-$). The counter-cation of the weakly-coordinating anion salt is selected from the group consisting of an alkali metal and ammonium ($NH_4^+$). Preferably the alkali metal counter-cation is potassium or sodium.

In certain exemplary embodiments, the weakly-coordinating anion salt comprises a hexafluorophosphate anion. In certain exemplary embodiments, the sizing composition comprises at least one of the following weakly-coordinating anion salts: potassium hexafluorophosphate ($KPF_6$); sodium hexafluorophosphate ($NaPF_6$); and ammonium hexafluorophosphate ($NH_4PF_6$). In certain exemplary embodiments, the weakly-coordinating anion salt comprises a hexafluoroarsenate anion. In certain exemplary embodiments, the sizing composition comprises at least one of the following weakly-coordinating anion salts: potassium hexafluoroarsenate ($KAsF_6$); sodium hexafluoroarsenate ($NaAsF_6$); and ammonium hexafluoroarsenate ($NH_4AsF_6$). In certain exemplary embodiments, the weakly-coordinating anion salt comprises a hexafluoroantimonate anion. In certain exemplary embodiments, the sizing composition comprises at least one of the following weakly-coordinating anion salts: potassium hexafluoroantimonate ($KSbF_6$); sodium hexafluoroantimonate ($NaSbF_6$); and ammonium hexafluoroantimonate ($NH_4SbF_6$). In certain exemplary embodiments, the weakly-coordinating anion salt comprises a hexafluorobismuthate anion. In certain exemplary embodiments, the sizing composition comprises at least one of the following weakly-coordinating anion salts: potassium hexafluorobismuthate ($KBiF_6$); sodium hexafluorobismuthate ($NaBiF_6$); and ammonium hexafluorobismuthate ($NH_4BiF_6$). In certain exemplary embodiments, the sizing composition comprises at least one of the following weakly-coordinating anion salts: potassium hexafluorophosphate ($KPF_6$); sodium hexafluorophosphate ($NaPF_6$); ammonium hexafluorophosphate ($NH_4PF_6$); potassium hexafluoroarsenate ($KAsF_6$); sodium hexafluoroarsenate ($NaAsF_6$); ammonium hexafluoroarsenate ($NH_4AsF_6$); potassium hexafluoroantimonate ($KSbF_6$); sodium hexafluoroantimonate ($NaSbF_6$); ammonium hexafluoroantimonate ($NH_4SbF_6$); potassium hexafluorobismuthate ($KBiF_6$); sodium hexafluorobismuthate ($NaBiF_6$); and ammonium hexafluorobismuthate ($NH_4BiF_6$).

In certain exemplary embodiments, the sizing composition includes a weakly-coordinating anion salt in an amount such that the weakly-coordinating anion salt comprises from 0.5 wt % to 10 wt % of the dry solids content of the sizing composition. In certain exemplary embodiments, the weakly-coordinating anion salt comprises from 1 wt % to 8 wt % of the dry solids content of the sizing composition. In certain exemplary embodiments, the weakly-coordinating anion salt comprises from 1.5 wt % to 4.5 wt % of the dry solids content of the sizing composition. In certain exemplary embodiments, the weakly-coordinating anion salt comprises from 2.5 wt % to 4.5 wt % of the dry solids content of the sizing composition. In certain of the foregoing exemplary embodiments, the weakly-coordinating anion salt is selected from the group consisting of: potassium hexafluorophosphate ($KPF_6$); sodium hexafluorophosphate ($NaPF_6$); ammonium hexafluorophosphate ($NH_4PF_6$); potassium hexafluoroarsenate ($KAsF_6$); sodium hexafluoroarsenate ($NaAsF_6$); ammonium hexafluoroarsenate ($NH_4AsF_6$); potassium hexafluoroantimonate ($KSbF_6$); sodium hexafluoroantimonate ($NaSbF_6$); ammonium hexafluoroantimonate ($NH_4SbF_6$); potassium hexafluorobismuthate ($KBiF_6$); sodium hexafluorobismuthate ($NaBiF_6$); ammonium hexafluorobismuthate ($NH_4BiF_6$); and combinations thereof. In certain of the foregoing exemplary embodiments, the weakly-coordinating anion salt comprises a hexafluorophosphate salt. In certain of the foregoing exemplary embodiments, the weakly-coordinating anion salt comprises potassium hexafluorophosphate ($KPF_6$).

The exemplary sizing compositions disclosed herein also include water. The sizing composition contains an amount of water sufficient to dilute the solids of the sizing composition to a viscosity that is suitable for application to reinforcing fibers. In accordance with certain exemplary embodiments, the sizing composition comprises water in an amount of from 80 wt % to 99.5 wt % of the sizing composition, including from 85 wt % to 97 wt % of the sizing composition. The total solids content, or amount of dry solids, of the sizing composition may be from 0.5 wt % to about 20 wt %, including from 3 wt % to 15 wt %. Preferably, the sizing composition has a total solids content of 8 wt % to 15 wt %. The total solids content of the sizing composition may be modified, for example, depending on the nature of the reinforcing fibers to which the sizing composition is to be applied, the surface properties of the reinforcing fibers, and when it is desired to generate differences in surface wettability.

In certain exemplary embodiments, the sizing composition comprises a film former in an amount of from 50 wt % to 90 wt % based on the dry solids content of the sizing composition, a silane coupling agent in an amount of from 5 wt % to 20 wt % based on the dry solids content of the sizing composition, and a weakly-coordinating anion salt in an amount of from 0.5 wt % to 10 wt % based on the dry solids content of the sizing composition. In certain exemplary embodiments, the sizing composition comprises a modified polyolefin film former in an amount of from 50 wt % to 90 wt % based on the dry solids content of the sizing composition, an amino silane coupling agent in an amount of from 5 wt % to 20 wt % based on the dry solids content of the sizing composition, and a hexafluorophosphate salt in an amount of from 0.5 wt % to 10 wt % based on the dry solids content of the sizing composition. In certain exemplary embodiments, the sizing composition comprises a maleic anhydride modified polypropylene film former in an amount of from 50 wt % to 90 wt % based on the dry solids content of the sizing composition, a γ-aminopropyltriethoxysilane coupling agent in an amount of from 5 wt % to 20 wt % based on the dry solids content of the sizing composition, and a potassium hexafluorophosphate salt in an amount of from 0.5 wt % to 10 wt % based on the dry solids content of the sizing composition.

In certain exemplary embodiments, the sizing composition comprises an amine compound. In certain exemplary embodiments, the sizing composition comprises an amine compound in an amount of from 0.1 wt % to 6 wt % based on the dry solids content of the sizing composition, including from 0.5 wt % to 5 wt %, from 1 wt % to 5 wt %, and also including from 2.5 wt % to 5 wt % based on the dry solids content of the sizing composition. In certain of the foregoing embodiments, the amine compound is a polyamine (e.g., 1,2-diaminopropane, 1,3-diaminopropane, hexamethylenediamine).

The exemplary sizing compositions disclosed herein may also include other components that are conventionally used in sizing compositions. For example, the sizing compositions may optionally include wetting agents, surfactants, lubricants, antioxidants, dyes, oils, fillers, thermal stabilizers, antifoaming agents, dust suppression agents, antimicrobial agents, antistatic agents, fungicides, biocides, and/or other conventional additives. The amount of the foregoing optional components in the sizing composition may range from 1 wt % to 30 wt % based on the dry solids content of the sizing composition.

The exemplary sizing compositions disclosed herein may have a pH ranging from 7 to 12. In certain exemplary embodiments, the sizing composition has a pH of from 9 to 12.

The exemplary sizing compositions disclosed herein may be prepared by combining the ingredients thereof according to any method known to one of ordinary skill in the art. In certain exemplary embodiments, deionized water is added to a container. Next, the film former and the weakly-coordinating anion salt are added to the container with agitation. The silane coupling agent is then added to the container and mixed to form the sizing composition. In certain exemplary embodiments, the silane coupling agent is hydrolyzed in water prior to combining with the other ingredients of the sizing composition. If necessary, the pH of the mixture may be adjusted to a desired level. The resulting sizing composition may be diluted with additional deionized water to achieve a target total solids content.

The exemplary sizing composition disclosed herein may be applied to fiber materials by any suitable method to form fibers coated with the exemplary sizing composition. The exemplary sizing composition may be applied to a wide variety of fiber types. Exemplary fiber types to which the exemplary sizing composition may be applied include, but are not limited to, glass fibers, polymer fibers, mineral fibers, carbon fibers, ceramic fibers, and graphite fibers.

In one exemplary embodiment, reinforcing fibers for use in reinforcing a polymer composition are provided. The reinforcing fibers comprise fibers selected from the group consisting of glass fibers, polymer fibers, mineral fibers, carbon fibers, ceramic fibers, graphite fibers, and combinations thereof. The fibers are coated with the presently disclosed sizing composition. Any of the previously disclosed and described embodiments of the sizing composition may be applied to the fibers to form the reinforcing fibers.

In certain exemplary embodiments, the fibers to which the exemplary sizing composition is applied comprise glass fibers. Any type of glass, such as A-type glass, C-type glass, E-type glass, S-type glass, or modifications thereof is suitable for use as the fiber material. For example, in one modification of E-type glass, the boron oxide is replaced by magnesium oxide. Such a glass is commercially available from Owens Corning Composite Materials, LLC (Toledo, Ohio) under the trade name Advantex™.

The fibers may be in the form of individual filaments, twisted yarns, strands, or rovings. The reinforcing fibers may be used in continuous or discontinuous form for use reinforcing a polymer composition. The term "continuous" as used herein with respect to the reinforcing fibers is intended to include reinforcing fibers that are in the form of unbroken filaments, threads, strands, yarns, or rovings, and which may either be sized directly after formation in a continuous fiber-forming operation or which may be formed and wound into packages that can be unwound at a later time to allow application of the sizing composition. The term "discontinuous" as used herein with respect to the reinforcing fibers is intended to include reinforcing fibers that have been segmented by chopping or cutting, or which are formed from a process designed to form segmented fibers such as a fiber-forming spinner process. The discontinuous reinforcing fibers may have a generally uniform length, may be provided in a bimodal or other structured distribution of lengths, or may represent a more random distribution. The discontinuous reinforcing fibers may be provided in a variety of lengths, typically ranging from about 2 mm to about 25 mm, although some applications may utilize longer fibers.

In addition, the fibers to which the exemplary sizing composition is applied may have various diameters. For example, the fibers, whether continuous fibers or discontinuous fibers, may have a diameter of from 10 microns to 500 microns, from 10 microns to 100 microns, from 10 microns to 50 microns, from 10 microns to 25 microns, and also including fibers having a diameter of 14 microns to 18 microns.

The exemplary sizing composition may be applied, for example, to continuous filaments of a fiber material immediately after they are formed in an in-line operation, that is, as part of the filament formation process. Alternatively, the exemplary sizing composition may be applied off-line to unwound strands of fiber material that were previously formed and packaged. Also, the strands may be cut or chopped in an off-line process. Means for applying the exemplary sizing composition include, but are not limited to, pads, sprayers, rollers or immersion baths, which allow a substantial amount of the surfaces of the filaments of the fiber material to be wetted with the sizing composition.

In certain exemplary embodiments, the sizing composition is applied to a plurality of continuously forming filaments of a fiber material as soon as they are formed from a fiber-forming apparatus such as a bushing. The bushing is preferably equipped with small apertures to allow passage of thin streams of a molten fiber material. As the streams of molten material emerge from the bushing apertures, each stream is attenuated and pulled downward to form a long, continuous filament. After the filament formation process which includes the application of the sizing composition, the continuously forming filaments may then be gathered into strands and chopped or cut in an in-line operation, or they may be gathered into strands for winding into forming packages or doffs after which they may be optionally chopped in an off-line operation. The chopped strands or the forming packages are then dried. Typically, chopped strands are dried in an oven using a temperature ranging from about 50° C. to about 300° C. Typically, forming packages are dried, for example, in a static oven for a period of about 3 hours to about 30 hours at a temperature of about 100° C. to about 150° C., after which they are ready for subsequent use.

Of course, any other drying techniques functioning at lower or higher temperatures based on different technologies can be used.

In one exemplary embodiment of reinforcing fibers, the sizing composition is applied to the fibers such that the sizing composition is present on the fibers in an amount of from 0.05 wt % to 2 wt % based on the total weight of the sized fibers. The amount of sizing composition present on the fibers is also referred to as "strand solids content." In certain exemplary embodiments, the sizing composition is present on the fibers in an amount of from 0.1 wt % to 1.5 wt % based on the total weight of the sized fibers, including from 0.25 wt % to 1 wt %, from 0.4 wt % to 1 wt %, from 0.5 wt % to 0.9 wt %, and also including from 0.55 wt % to 0.8 wt % based on the total weight of the sized fibers. This can be determined by the loss on ignition (LOI) of the sized fibers, which is the reduction in weight experienced by the sized fibers after heating them to a temperature sufficient to burn or pyrolyze the sizing composition from the fibers.

The reinforcing fibers, which are coated with the exemplary sizing composition disclosed herein, may be used to form a fiber reinforced composite material or product. Accordingly, in one exemplary embodiment, a fiber reinforced composite is provided. The fiber reinforced composite comprises a polymer matrix and reinforcing fibers distributed throughout the polymer matrix. As mentioned above, the reinforcing fibers are coated with the exemplary sizing composition disclosed and described herein, which comprises a film former, a silane coupling agent, and a weakly-coordinating anion salt.

A wide variety of polymer materials are suitable for use as the polymer matrix. Exemplary polymer materials suitable for use as the polymer matrix of the fiber reinforced composite include, but are not limited to, thermoplastic polymers; thermoset polymers; solution processable polymers; aqueous based polymers, monomers, and oligomers; and polymers curable by air, heat, light, x-rays, gamma rays, microwave radiation, dielectric heating, UV radiation, infrared radiation, corona discharge, electron beams, and other similar forms of electromagnetic radiation. In certain exemplary embodiments, the polymer matrix comprises a polymer material selected from the group consisting of polyolefins, modified polyolefins, saturated polyesters, unsaturated polyesters, polyacetals, polyamides, polyacrylamides, polyimides, polyethers, polyvinyl ethers, polystyrenes, polyoxides, polycarbonates, polysiloxanes, polysulfones, polyanhydrides, polyimineepoxies, polyacrylics, polyvinylesters, polyurethanes, maleic resins, urea resins, melamine resins, phenol resins, furan resins, polymer blends, polymer alloys, and combinations thereof.

In certain exemplary embodiments, the polymer matrix of the fiber reinforced composite comprises a polyolefin. The polyolefin may be a homopolymer, a copolymer, and may or may not contain impact modifiers. In certain exemplary embodiments, the polymer matrix of the fiber reinforced composite comprises a polypropylene homopolymer. One example of a suitable polypropylene homopolymer is BOREALIS HD120, which is commercially available from Borealis AG (Vienna, Austria). In forming the fiber reinforced composite, during the compounding process the composite formulation may also include one or more conventionally known additives such as coupling agents, compatibilizers, adhesion promoters, flame retardants, pigments, antioxidants, lubricants, antistats, and fillers all mostly in solid forms at room temperature. An example of a suitable coupling agent for use in the exemplary fiber reinforced composite is POLYBOND® 3200 (a maleic anhydride modified polypropylene homopolymer), which is commercially available from Addivant (Danbury, Conn.). Typically the additives are used in amounts of from 0.1 wt % to 10 wt % of the total weight of the reinforcing fibers and the polymer matrix, including from 0.2 wt % to 7.5 wt %, from 0.5 wt % to 5 wt %, and also including from 1 wt % to 5 wt % of the total weight of the reinforcing fibers and the polymer matrix.

The exemplary fiber reinforced composite may be prepared by any conventional process known in the art. For example, the reinforcing fibers and the polymer matrix may be compounded and molded into a fiber reinforced composite using techniques including, but not limited to, extrusion, wire coating, compression molding, injection molding, extrusion-compression molding, extrusion-injection-compression molding, long fiber injection, pultrusion and pushtrusion. In certain embodiments, when making polyolefin composites, the reinforcing fibers sized with the sizing composition disclosed herein is extruded with a polyolefin matrix to form pellets. The pellets are then used in an injection molding process to form a fiber reinforced composite article.

In certain exemplary embodiments, the amount of the polymer matrix material included in the fiber reinforced composite ranges from 10 wt % to 99 wt % based on the total weight of the fiber reinforced composite. In certain exemplary embodiments, the fiber reinforced composite comprises from 20 wt % to 95 wt % of polymer matrix material, including from 30 wt % to 90 wt %, from 40 wt % to 80 wt %, from 50 wt % to 75 wt %, and also including 60 wt % to 75 wt % of polymer matrix material, based on the total weight of the fiber reinforced composite.

In certain exemplary embodiments, the amount of reinforcing fibers coated with the exemplary sizing composition disclosed and described herein included in the fiber reinforced composite ranges from 1 wt % to 90 wt % based on the total weight of the fiber reinforced composite. In certain exemplary embodiments, the fiber reinforced composite comprises from 5 wt % to 80 wt % of reinforcing fibers coated with the exemplary sizing composition disclosed and described herein, including from 10 wt % to 70 wt %, from 20 wt % to 60 wt %, from 25 wt % to 50 wt %, and also including 25 wt % to 40 wt % of reinforcing fibers coated with the exemplary sizing composition disclosed and described herein, based on the total weight of the fiber reinforced composite.

The exemplary sizing composition including the weakly-coordinating anion salts disclosed and described herein provides a coating on the reinforcing fibers that improves compatibility and adhesion with the polymer matrix material. In addition, the exemplary sizing compositions having the weakly-coordinating anion salts disclosed and described herein, when used on reinforcing fibers that are incorporated into fiber reinforced composites, results in composites having improved mechanical properties compared to otherwise identical composites that include reinforcing fibers that are coated with sizing compositions that do not include the weakly-coordinating anion salts disclosed and described herein, particularly when the fiber reinforced composite is subjected to prolonged exposure to water. As mentioned above, it is believed that the weakly-coordinating anion salts disclosed and described herein have a hydrophobizing effect on the fiber surface (caused by local concentration of grouped fluorine entities) that may favor interaction between the sizing composition and the polymer matrix, which results in stronger adhesion as well as provides protection against the degrading effects of water.

EXAMPLES

The following examples illustrate exemplary embodiments of sizing compositions, reinforcing fibers, and fiber reinforced composites as disclosed and described herein. The exemplary embodiments are provided solely for the purpose of illustration and should not be construed as limiting the present disclosure. Numerous variations of the specific embodiments are possible without departing from the spirit and scope of the exemplary sizing compositions, reinforcing fibers, and fiber reinforced composites as disclosed and described herein.

Sizing compositions according to the present disclosure (Examples 1-6) and comparative sizing compositions (C1-C3) were prepared according to the formulations listed in Table 1 below. The amount of materials used to prepare the sizing compositions are listed as kilogram per 100 kilograms of the sizing composition.

TABLE 1

| Sizing Composition | Modified Polyolefin[1] Film Former | Silane Coupling Agent[2] | Amine Compound | Salt[3,4] | Water |
|---|---|---|---|---|---|
| C1 | 17.52 kg | 1.57 kg | 0.43 kg | — | 93.13 kg |
| C2 | 17.51 kg | 1.57 kg | 0.43 kg | — | 93.13 kg |
| C3 | 17.00 kg | 1.57 kg | 0.43 kg | 0.18 kg $NaBF_4$ (2.5 wt %) | 93.13 kg |
| Example 1 | 17.26 kg | 1.57 kg | 0.43 kg | 0.09 kg $NaPF_6$ (1.5 wt %) | 93.13 kg |
| Example 2 | 17.00 kg | 1.57 kg | 0.43 kg | 0.18 kg $NaPF_6$ (2.5 wt %) | 93.13 kg |
| Example 3 | 16.77 kg | 1.57 kg | 0.43 kg | 0.26 kg $NaPF_6$ (3.5 wt %) | 93.13 kg |
| Example 4 | 16.77 kg | 1.57 kg | 0.43 kg | 0.26 kg $KPF_6$ (3.5 wt %) | 93.13 kg |
| Example 5 | 16.57 kg | 1.57 kg | 0.43 kg | 0.33 kg $NaPF_6$ (4.5 wt %) | 93.13 kg |
| Example 6 | 16.57 kg | 1.57 kg | 0.43 kg | 0.33 kg $NaPF_6$ (4.5 wt %) | 93.13 kg |

[1] Modified polypropylene emulsion with about 35 wt % active solids.
[2] A-1100 silane (γ-aminopropyltritethoxysilane) with about 58 wt % active solids.
[3] The salts used in the sizing compositions were 100 wt % active solids.
[4] The weight percentage is based on the weight of the total dry solids of the sizing composition.

Each of the sizing compositions listed in Table 1 were applied to glass fibers using a submerged applicator roller process. The glass fibers had a diameter of about 13 μm. The glass fibers were then gathered to form a strand that was subsequently chopped using an in-line chopping process. The chopped strands were chopped to have a length of about 4.5 mm. The chopped strands were then conveyed to a drying oven to cure the sizing composition on the glass fibers, thus forming reinforcing fibers coated with a sizing composition listed in Table 1.

The reinforcing fibers coated with a sizing composition listed in Table 1 were used to form compounded pellets. In particular, about 30 wt % reinforcing fibers coated with a sizing composition listed in Table 1 were combined with approximately 69 wt % polypropylene matrix resin (BOREALIS HD120 from Borealis AG of Vienna, Austria) and approximately 1 wt % coupling agent (POLYBOND® 3200 maleic anhydride modified polypropylene homopolymer from Addivant of Danbury, Conn.) in a twin-screw extruder to form compounded pellets. The extruded compounded pellets were then fed into an injection molding machine to produce fiber reinforced composite test samples.

The fiber reinforced composite test samples containing reinforcing fibers coated with a sizing composition listed in Table 1 were tested to measure certain physical properties, including tensile strength, flexural strength, Charpy impact strength, and Izod impact strength. The testing was conducted with both freshly molded test samples (dry as molded or DAM) and aged test samples that had been exposed to a water bath maintained at 95° C. for 15 days and 30 days (also referred to as "hydro-aged"). The test results of the fiber reinforced composites are reported in Tables 2-5. The fiber reinforced composite test samples are identified using the same nomenclature as used for the sizing compositions listed in Table 1. For example, the C1 fiber reinforced composite test sample contains reinforcing fibers coated with the C1 sizing composition listed in Table 1.

Tensile strength is a measure of resistance when an elongating force is applied. The tensile strength of the fiber reinforced composite samples was measured in accordance with ISO 527-2. The results of the tensile strength testing are reported in Table 2 below.

TABLE 2

| Fiber Reinforced Composite Samples | Tensile Strength (MPa) | | |
|---|---|---|---|
| | DAM | 15 Day Hydro-aged | 30 Day Hydro-aged |
| C1 | 92.2 | 74.1 | 61.8 |
| C2 | 92.2 | 73.1 | 65.5 |
| C3 | 96.1 | 84.0 | 73.4 |
| Example 1 | 92.6 | 84.9 | 72.4 |
| Example 2 | 93.6 | 92.1 | 85.7 |
| Example 3 | 94.1 | 93.6 | 92.9 |
| Example 4 | 93.2 | 92.0 | 89.1 |
| Example 5 | 94.4 | 93.3 | 93.4 |
| Example 6 | 93.7 | 92.1 | 92.1 |

Flexural strength, or bend strength, is defined as the stress in a material just before it yields in a flexure test. Accordingly, the flexural strength represents the highest stress experienced within the material at its moment of failure. The flexural strength of the fiber reinforced composite samples was measured in accordance with ISO 178. The results of the flexural strength testing are reported in Table 3 below.

TABLE 3

| Fiber Reinforced Composite Samples | Flexural Strength (MPa) | | |
|---|---|---|---|
| | DAM | 15 Day Hydro-aged | 30 Day Hydro-aged |
| C1 | 139.4 | 105.7 | 96.6 |
| C2 | 138.7 | 106.4 | 101.0 |
| C3 | 145.8 | 120.7 | 111.4 |
| Example 1 | 138.7 | 124.0 | 109.9 |
| Example 2 | 140.5 | 134.9 | 128.9 |
| Example 3 | 141.6 | 137.6 | 136.6 |
| Example 4 | 142.1 | 136.4 | 133.1 |
| Example 5 | 141.9 | 136.4 | 135.5 |
| Example 6 | 142.2 | 136.5 | 136.2 |

The fiber reinforced composite samples were also tested for Charpy impact strength and Izod impact strength. The Charpy and Izod impact strengths are determined from impact tests that measure the resistance to failure of the samples to a suddenly applied force. These tests measure the impact energy, or the energy absorbed prior to fracture. The Charpy impact strength of the fiber reinforced composite samples was measured in accordance with ISO 179-1. The Izod impact strength of the fiber reinforced composite samples was measured in accordance with ISO 180. The results of the Charpy impact strength testing and the Izod impact strength testing are reported in Tables 4 and 5, respectively.

TABLE 4

| Fiber Reinforced Composite Samples | Charpy Impact Strength (kJ/m$^2$) | | |
|---|---|---|---|
| | DAM | 15 Day Hydro-aged | 30 Day Hydro-aged |
| C1 | 51.3 | 23.7 | 20.0 |
| C2 | 55.3 | 24.4 | 20.4 |
| C3 | 56.6 | 30.4 | 25.2 |
| Example 1 | 55.8 | 31.9 | 23.2 |
| Example 2 | 54.0 | 41.1 | 33.0 |
| Example 3 | 53.6 | 46.6 | 44.0 |
| Example 4 | 53.8 | 43.1 | 38.6 |
| Example 5 | 52.5 | 44.6 | 42.8 |
| Example 6 | 53.3 | 44.5 | 43.5 |

TABLE 5

| Fiber Reinforced Composite Samples | Izod Impact Strength (J/m) | | |
|---|---|---|---|
| | DAM | 15 Day Hydro-aged | 30 Day Hydro-aged |
| C1 | 88.3 | 46.2 | 35.3 |
| C2 | 89.9 | 46.0 | 33.7 |
| C3 | 102.5 | 68.0 | 45.7 |
| Example 1 | 93.5 | 65.7 | 45.0 |
| Example 2 | 91.6 | 77.6 | 64.2 |
| Example 3 | 96.0 | 91.7 | 86.8 |
| Example 4 | 98.8 | 85.7 | 79.4 |
| Example 5 | 96.0 | 85.6 | 83.7 |
| Example 6 | 97.5 | 87.0 | 84.1 |

As reflected in Tables 2-5, the fiber reinforced composites formed with reinforcing fibers coated with the sizing compositions of Examples 1-6, which include a weakly-coordinating anion salt disclosed and described herein, exhibited comparable properties relative to the comparative samples C1-C3 when measured in the dry as molded (DAM) state. On the other hand, when the fiber reinforced composites were subjected to hydro-aging, the fiber reinforced composites of Examples 1-6 retained their mechanical strength much better than the fiber reinforced composites of comparative samples C1-C3.

For example, after the 15 day and 30 day hydro-aging periods, the composite of the C3 sample retained about 87% and about 76%, respectively, of its DAM tensile strength. However, the composite of Example 1 retained about 92% and about 78% of its DAM tensile strength after the 15 day and 30 day hydro-aging periods, respectively, while each of the composites of Examples 2-6 retained more than 98% of their DAM tensile strength after the 15 day hydro-aging period and more than 91% of their DAM tensile strength after the 30 day hydro-aging period. Similarly, the composite of the C3 sample retained about 83% and about 76% of its DAM flexural strength after the 15 day and 30 day hydro-aging periods, respectively. On the other hand, the composite of Example 1 retained about 89% and about 79% of its DAM flexural strength after the 15 day and 30 day hydro-aging periods, respectively, while each of the composites of Examples 2-6 retained more than 95% of their DAM flexural strength after the 15 day hydro-aging period and more than 91% of their DAM flexural strength after the 30 day hydro-aging period.

Similar results were observed with respect to the Charpy impact strength and the Izod impact strength. For example, after the 15 day and 30 day hydro-aging periods, the composite of the C3 sample retained about 54% and about 45%, respectively of its DAM Charpy impact strength and about 66% and about 45%, respectively, of its DAM Izod impact strength. The composite of Example 1 retained about 57% and about 42% of its DAM Charpy impact strength after the 15 day and 30 day hydro-aging periods, respectively, and about 70% and about 48% of its DAM Izod impact strength after the 15 day and 30 day hydro-aging periods, respectively. The composites of Examples 2-6 retained more than 76% of its DAM Charpy impact strength and more than 84% of its DAM Izod impact strength after the 15 day hydro-aging period, and more than 61% of its DAM Charpy impact strength and more than 70% of its DAM Izod impact strength after the 30 day hydro-aging period.

The results of the mechanical testing demonstrate that the exemplary sizing compositions that include the weakly-coordinating anion salts disclosed and described herein result in composite materials that are better able to withstand the degrading effects of water over a prolonged period as compared to conventional sizing compositions. It is believed that the weakly-coordinating anion salts disclosed and described herein have a hydrophobizing effect on the fiber surface (caused by local concentration of grouped fluorine entities) that may favor affinity between the sizing composition and the polymer matrix, which results in stronger interaction as well as provides protection against the degrading effects of water.

The scope of the general inventive concepts are not intended to be limited to the particular exemplary embodiments shown and described herein. From the disclosure given, those skilled in the art will not only understand the general inventive concepts and their attendant advantages, but will also find apparent various changes and modifications to the compositions and methods disclosed. It is sought, therefore, to cover all such changes and modifications as fall within the spirit and scope of the general inventive concepts, as described and claimed herein, and any equivalents thereof.

What is claimed is:

1. A sizing composition comprising:
   water;
   a film former;
   a silane coupling agent; and
   a weakly-coordinating anion salt;
   wherein the weakly-coordinating anion salt comprises a weakly-coordinating anion and a counter-cation;
   wherein the weakly-coordinating anion is selected from the group consisting of hexafluorophosphate, hexafluoroarsenate, hexafluoroantimonate, and hexafluorobismuthate; and
   wherein the counter-cation is selected from the group consisting of an alkali metal, ammonium, and an alkaline earth metal.

2. The sizing composition according to claim 1, wherein the weakly-coordinating anion salt comprises hexafluorophosphate.

3. The sizing composition according to claim 1, wherein the sizing composition comprises one or more of: sodium hexafluorophosphate; potassium hexafluorophosphate; and ammonium hexafluorophosphate.

4. The sizing composition according to claim 1, wherein the film former comprises a modified polyolefin.

5. The sizing composition according to claim 1, wherein
   the film former comprises from 50 wt % to 90 wt % of the dry solids of the sizing composition;
   the silane coupling agent comprises from 5 wt % to 20 wt % of the dry solids of the sizing composition; and
   the weakly-coordinating anion salt comprises from 0.5 wt % to 10 wt % of the dry solids of the sizing composition.

6. The sizing composition according to claim 1, wherein the sizing composition has a total solids content of 0.5 wt % to 10 wt %.

7. Reinforcing fibers for use in reinforcing a polymer composition, the reinforcing fibers comprising:
   fibers selected from the group consisting of glass fibers, mineral fibers, polymeric fibers, carbon fibers, ceramic fibers, graphite fibers, and combinations thereof, wherein the fibers are coated with a sizing composition, wherein the sizing composition comprises:
   a film former;
   a silane coupling agent; and
   a weakly-coordinating anion salt;
   wherein the weakly-coordinating anion salt comprises a weakly-coordinating anion and a counter-cation;
   wherein the weakly-coordinating anion is selected from the group consisting of hexafluorophosphate, hexafluoroarsenate, hexafluoroantimonate, and hexafluorobismuthate; and
   wherein the counter-cation is selected from the group consisting of an alkali metal, ammonium, and an alkaline earth metal.

8. The reinforcing fibers according to claim 7, wherein the fibers are glass fibers.

9. The reinforcing fibers according to claim 7, wherein the weakly-coordinating anion salt comprises hexafluorophosphate.

10. The reinforcing fibers according to claim 7, wherein the sizing composition comprises one or more of: sodium hexafluorophosphate; potassium hexafluorophosphate; and ammonium hexafluorophosphate.

11. The reinforcing fibers according to claim 7, wherein the film former comprises a modified polyolefin.

12. The reinforcing fibers according to claim 7, wherein
the film former comprises from 50 wt % to 90 wt % of the dry solids of the sizing composition;
the silane coupling agent comprises from 5 wt % to 20 wt % of the dry solids of the sizing composition; and
the weakly-coordinating anion salt comprises from 0.5 wt % to 10 wt % of the dry solids of the sizing composition.

13. The reinforcing fibers according to claim 7, wherein the sizing composition comprises from 0.05 wt % to 2 wt % of the total weight of the reinforcing fibers.

14. A fiber reinforced composite comprising:
a polymer matrix; and
reinforcing fibers distributed throughout the polymer matrix, wherein the reinforcing fibers are coated with a sizing composition, wherein the sizing composition comprises:
a film former;
a silane coupling agent; and
a weakly-coordinating anion salt;
wherein the weakly-coordinating anion salt comprises a weakly-coordinating anion and a counter-cation;
wherein the weakly-coordinating anion is selected from the group consisting of hexafluorophosphate, hexafluoroarsenate, hexafluoroantimonate, and hexafluorobismuthate; and
wherein the counter-cation is selected from the group consisting of an alkali metal, ammonium, and an alkaline earth metal.

15. The fiber reinforced composite according to claim 14, wherein the polymer matrix is selected from the group consisting of polyolefins, modified polyolefins, saturated polyesters, unsaturated polyesters, polyacetals, polyamides, polyacrylamides, polyimides, polyethers, polyvinylethers, polystyrenes, polyoxides, polycarbonates, polysiloxanes, polysulfones, polyanhydrides, polyimines, epoxy resins, polyacrylics, polyvinylesters, polyurethanes, maleic resins, urea resins, melamine resins, phenol resins, furan resins, polymer blends, polymer alloys, and combinations thereof.

16. The fiber reinforced composite according to claim 14, wherein the reinforcing fibers comprise glass fibers.

17. The fiber reinforced composite according to claim 14, wherein the fiber reinforced composite comprises at least 30 wt % reinforcing fibers.

18. The fiber reinforced composite according to claim 14, wherein the weakly-coordinating anion salt comprises hexafluorophosphate.

19. The fiber reinforced composite according to claim 14, wherein the sizing composition comprises at least one or more of: sodium hexafluorophosphate; potassium hexafluorophosphate; and ammonium hexafluorophosphate.

20. The fiber reinforced composite according to claim 14, wherein the film former comprises a modified polyolefin.

21. The fiber reinforced composite according to claim 14, wherein
the film former comprises from 50 wt % to 90 wt % of the dry solids of the sizing composition;
the silane coupling agent comprises from 5 wt % to 20 wt % of the dry solids of the sizing composition; and
the weakly-coordinating anion salt comprises from 0.5 wt % to 10 wt % of the dry solids of the sizing composition.

* * * * *